United States Patent
Twardochleb et al.

(10) Patent No.: US 9,316,154 B2
(45) Date of Patent: Apr. 19, 2016

(54) GAS TURBINE FUEL INJECTOR WITH METERING CAVITY

(71) Applicant: Solar Turbines Incorporated, San Diego, CA (US)

(72) Inventors: Christopher Zdzislaw Twardochleb, Alpine, CA (US); James Gregory Roesch, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 535 days.

(21) Appl. No.: 13/788,840

(22) Filed: Mar. 7, 2013

(65) Prior Publication Data

US 2014/0250907 A1 Sep. 11, 2014

(51) Int. Cl.

| F02G 3/00 | (2006.01) |
|---|---|
| F02C 7/22 | (2006.01) |
| F02C 7/232 | (2006.01) |
| F23R 3/14 | (2006.01) |
| F23R 3/34 | (2006.01) |
| F23R 3/36 | (2006.01) |
| F23D 17/00 | (2006.01) |
| F02C 7/24 | (2006.01) |
| F23K 5/18 | (2006.01) |
| F23R 3/28 | (2006.01) |

(52) U.S. Cl.
CPC . *F02C 7/22* (2013.01); *F02C 7/232* (2013.01); *F23D 17/002* (2013.01); *F23R 3/14* (2013.01); *F23R 3/286* (2013.01); *F23R 3/343* (2013.01); *F23R 3/36* (2013.01); *F02C 7/24* (2013.01); *F23K 5/18* (2013.01); *F23R 3/283* (2013.01)

(58) Field of Classification Search
CPC .............. F23K 5/18; F02C 7/24; F02C 7/12; F02C 7/18; F02C 7/185; F23R 3/283; F05D 2260/20

USPC ....................................................... 60/39.094
See application file for complete search history.

(56) References Cited

U.S. PATENT DOCUMENTS

| 5,467,926 | A | 11/1995 | Idleman et al. |
|---|---|---|---|
| 5,836,163 | A | 11/1998 | Lockyer et al. |
| 9,151,227 | B2 * | 10/2015 | Lockyer ................. F02C 7/222 |
| 2003/0121269 | A1 * | 7/2003 | Mick ........................ F02C 3/22 60/779 |
| 2007/0074517 | A1 | 4/2007 | Chipman Rogers et al. |
| 2012/0111016 | A1 | 5/2012 | Lockyer et al. |
| 2012/0186083 | A1 | 7/2012 | Hernandez et al. |
| 2013/0283809 | A1 * | 10/2013 | Twardochleb ............ F02C 3/24 60/772 |

OTHER PUBLICATIONS

Twardochleb, C.D., Duckers, J.G., Gas Turbine Fuel Injector with Metering Cavity, U.S. Appl. No. 13/477,819, filed May 22, 2012, 23 pages.

* cited by examiner

*Primary Examiner* — Gerald L Sung
(74) *Attorney, Agent, or Firm* — Finnegan, Henderson, Farabow, Garrett & Dunner, LLP

(57) ABSTRACT

A fuel injector for a gas turbine engine may include a flow path for a fuel-air mixture extending longitudinally through the fuel injector, and a fuel gallery extending circumferentially around the flow path. The fuel gallery may be adapted to inject a liquid fuel into the flow path. The fuel injector may also include an annular casing positioned circumferentially around the fuel gallery to define an insulating chamber around the gallery. The fuel injector may also include an annular cover extending around the fuel injector to define a metering chamber. The fuel injector may further include one or more purge holes fluidly coupling the metering chamber to the insulating chamber, and one or more metering holes fluidly coupling the metering chamber to a volume exterior to the fuel injector.

20 Claims, 5 Drawing Sheets

GAS TURBINE FUEL INJECTOR WITH METERING CAVITY

TECHNICAL FIELD

The present disclosure relates generally to a fuel injector for a gas turbine engine, and more particularly, to a gas turbine fuel injector with a metering cavity.

BACKGROUND

Gas turbine engines (GTEs) produce power by extracting energy from a flow of hot gas produced by combustion of fuel in a stream of compressed air. In GTEs, a mixture of compressed air and fuel is burned in a combustor of the turbine engine. The resulting hot gases spin blades of a turbine to produce mechanical power. In a typical GTE, fuel injectors direct a liquid or gaseous hydrocarbon fuel into the combustor. Combustion of the fuel in the combustor may create temperatures exceeding 2000° F. (1093.3° C.). This high temperature in the vicinity of the fuel injector may lead to coking, and coke deposition, in liquid fuel conduits of the GTE. Over time, coking may lead to flow restrictions that adversely affect the operation of the GTE. In some fuel injectors, insulating chambers or shrouds may be disposed around liquid fuel conduits that are susceptible to coking.

U.S. patent application Ser. No. 13/477,819, filed May 22, 2012, titled "Fuel Injector with Purged Insulating Air Cavity," assigned to the assignee of the current application, describes a fuel injector with an insulating air cavity around a liquid fuel gallery. In the fuel injector of the '819 application, a purge hole is provided to maintain a positive pressure in the air cavity and thereby reduce accumulation of fuel-air mixture in the cavity.

SUMMARY

In one aspect, a fuel injector for a gas turbine engine is disclosed. The fuel injector may include a flow path for a fuel-air mixture extending longitudinally through the fuel injector, and a fuel gallery extending circumferentially around the flow path. The fuel gallery may be adapted to inject a liquid fuel into the flow path. The fuel injector may also include an annular casing positioned circumferentially around the fuel gallery to define an insulating chamber around the gallery. The fuel injector may also include an annular cover extending around the fuel injector to define a metering chamber. The fuel injector may further include one or more purge holes fluidly coupling the metering chamber to the insulating chamber, and one or more metering holes fluidly coupling the metering chamber to a volume exterior to the fuel injector.

In another aspect, a method of operating a gas turbine engine including a fuel injector is disclosed. The fuel injector may include a liquid fuel gallery extending circumferentially around the fuel injector through an insulating chamber, and a metering chamber spaced apart from the insulating chamber and circumferentially extending around the fuel injector. The insulating chamber and the metering chamber may be fluidly coupled together by one or more purge holes, and the metering chamber may be fluidly coupled to a compressed air space external to the fuel injector by one or more metering holes. The method may include mixing a fuel with compressed air and directing the resulting fuel-air mixture along a fuel flow path of the fuel injector. The method may also include directing compressed air from the compressed air space to the metering chamber through the one or more metering holes at a first velocity. The method may also include directing the compressed air from the metering chamber to the insulating chamber through the one or more purge holes at a second velocity lower than the first velocity. The method may further include exhausting the compressed air from the insulating chamber to the fuel flow path of the fuel injector.

In yet another aspect, a gas turbine engine is disclosed. The gas turbine engine may include a compressor, a combustor positioned downstream of the compressor, and a fuel injector fluidly coupling the compressor and the combustor. The fuel injector may be configured to direct a fuel-air mixture to the combustor through a flow path that extends longitudinally though the fuel injector. The fuel injector may include a gallery for liquid fuel at least partially encircling the flow path, and one or more spokes fluidly coupling the gallery to the flow path. The fuel injector may also include an annular casing extending circumferentially around the fuel injector to define an insulating chamber around the gallery. The fuel injector may also include an annular cover extending circumferentially around the fuel injector to define a metering chamber spaced apart from the insulating chamber. One or more purge holes may fluidly couple the insulating chamber and the metering chamber, and one or more metering holes may fluidly couple the metering chamber to a compressed air space around the fuel injector.

DETAILED DESCRIPTION

Figure 1:
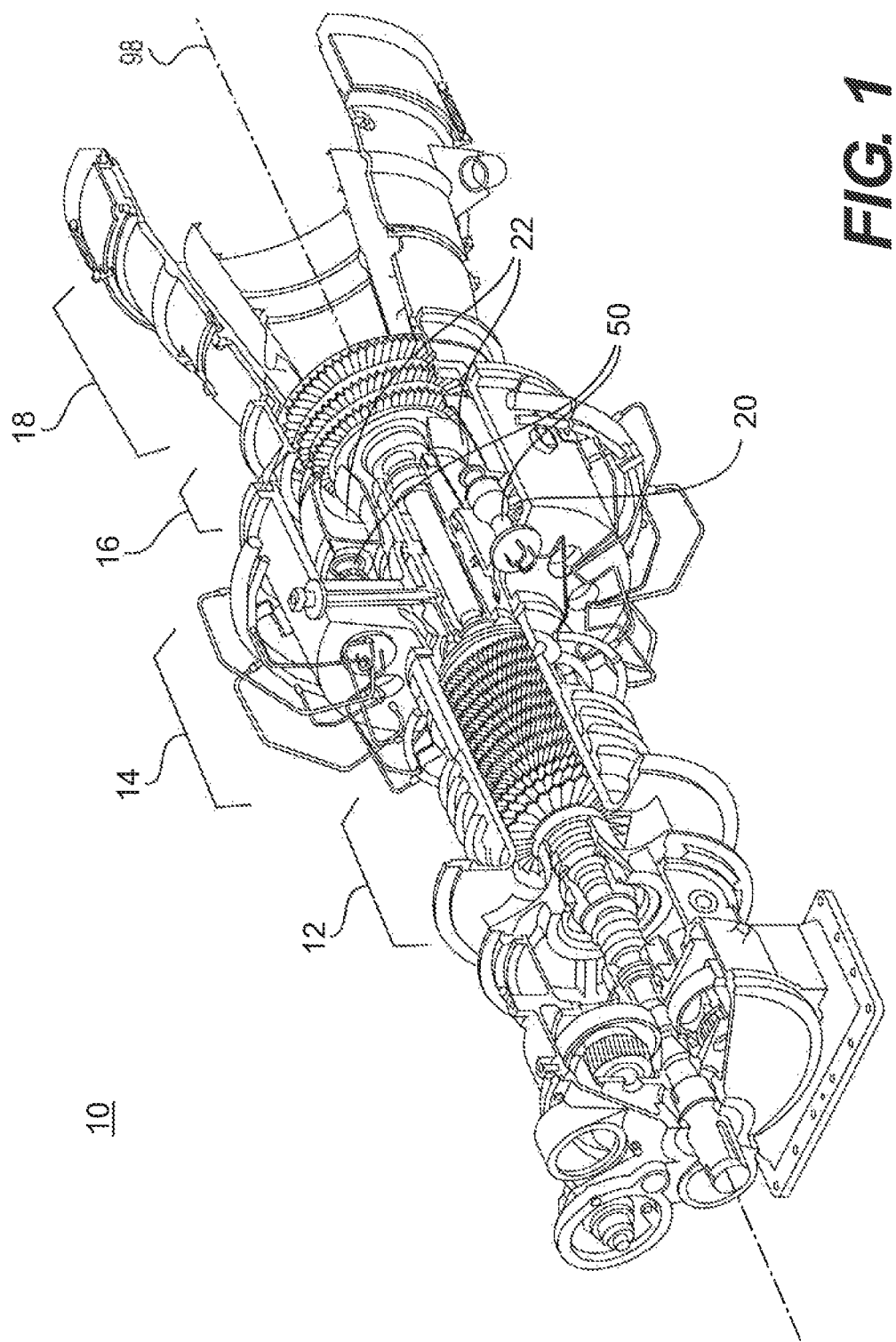
FIG. 1 is an illustration of an exemplary disclosed gas turbine engine system.

FIG. 1 illustrates an exemplary gas turbine engine (GTE) 10. GTE 10 may have, among other systems, a compressor system 12, a combustor system 14, a turbine system 16, and an exhaust system 18 arranged along an engine axis 98. Compressor system 12 compresses air to a high pressure and temperature (approximately 200 psi and 800° F. (426.7° C.) respectively) and delivers the compressed air to an enclosure 20 of combustor system 14. The compressed air is then directed from enclosure 20 into one or more fuel injectors 50 positioned therein. The compressed air is mixed with a fuel in fuel injector 50, and the mixture is directed to a combustor 22. The fuel-air mixture ignites and burns in the combustor 22 to produce combustion gases. These combustion gases are directed to the turbine system 16. Turbine system 16 extracts energy from the combustion gases, and directs the exhaust gases to atmosphere through the exhaust system 18. The layout of GTE 10 illustrated in FIG. 1, and described above, is only exemplary and fuel injectors 50 of the current disclosure may be used with any configuration and layout of GTE 10.

Figure 2:
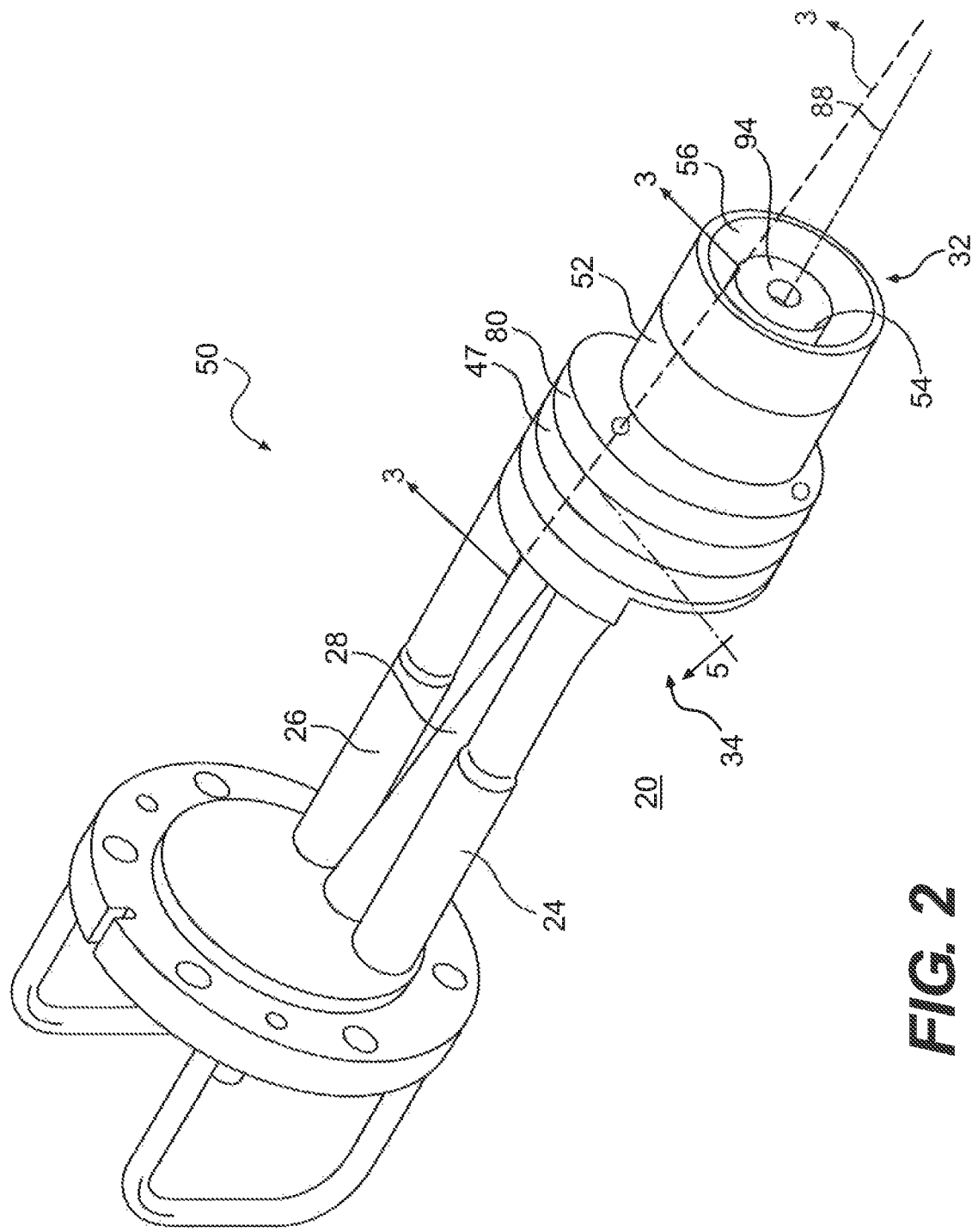
FIG. 2 is an illustration of an exemplary fuel injector used in the turbine engine of FIG. 1.

FIG. 2 is an illustration of an embodiment of a fuel injector 50 that may be coupled to combustor 22 of GTE 10. Fuel injector 50 extends from a first end 32 to a second end 34 along a longitudinal axis 88. The first end 32 is fluidly coupled to combustor 22 and the second end 34 is positioned in enclosure 20. Compressed air from enclosure 20 enters fuel injector 50 through openings (not visible in FIG. 2) on the second end 34. Liquid fuel is also directed into fuel injector 50 at the second end 34 through a liquid fuel line 24 (and pilot fuel supply line 28). This fuel is mixed with the compressed air flowing through the fuel injector 50, and the resulting fuel-air mixture is directed to the combustor 22 through the first end 32. Some embodiments of fuel injector 50 (such as the embodiment of fuel injector 50 illustrated in FIG. 2) may be a dual fuel injector that is configured to selectively deliver a gaseous fuel and a liquid fuel to combustor 22. In dual fuel injectors, the fuel delivered to fuel injector 50 may be switched between a gaseous and a liquid fuel to suit the operating conditions of GTE 10. For instance, at an operating site with an abundant supply of natural gas, fuel injector 50 may deliver liquid fuel to combustor 22 during start up and later switch to natural gas fuel to utilize the locally available fuel supply. In a dual fuel injector, in addition to the fuel lines that deliver liquid fuel, fuel lines may also deliver gaseous fuel to the fuel injector. For instance, in fuel injector 50 of FIG. 2, gas fuel line 26 may direct gaseous fuel to fuel injector 50.

To reduce the emission of atmospheric pollutants (such as $NO_x$) while maintaining a stable flame in combustor 22, fuel injector 50 directs a rich fuel-air mixture to combustor 22 through a centrally located pilot assembly 94. The pilot fuel supply line 28 supplies liquid and/or gaseous fuel to the pilot assembly 94. Fuel injector 50 also includes a tubular premix barrel 52 circumferentially disposed about a housing 54 of pilot assembly 94 to define an annular duct 56 around pilot assembly 94. A lean premixed fuel-air mixture is directed to combustor 22 through this annular duct 56. The liquid fuel (and gaseous fuel in the case of dual fuel injectors) and compressed air are directed to both pilot assembly 94 and annular duct 56 to form the pilot fuel-air mixture and the premixed fuel-air mixture, respectively. These fuel-air mixtures (pilot and premixed fuel-air mixtures) form separate fuel-air streams that are directed into combustor 22 through first end 32 of fuel injector 50.

Figure 3:
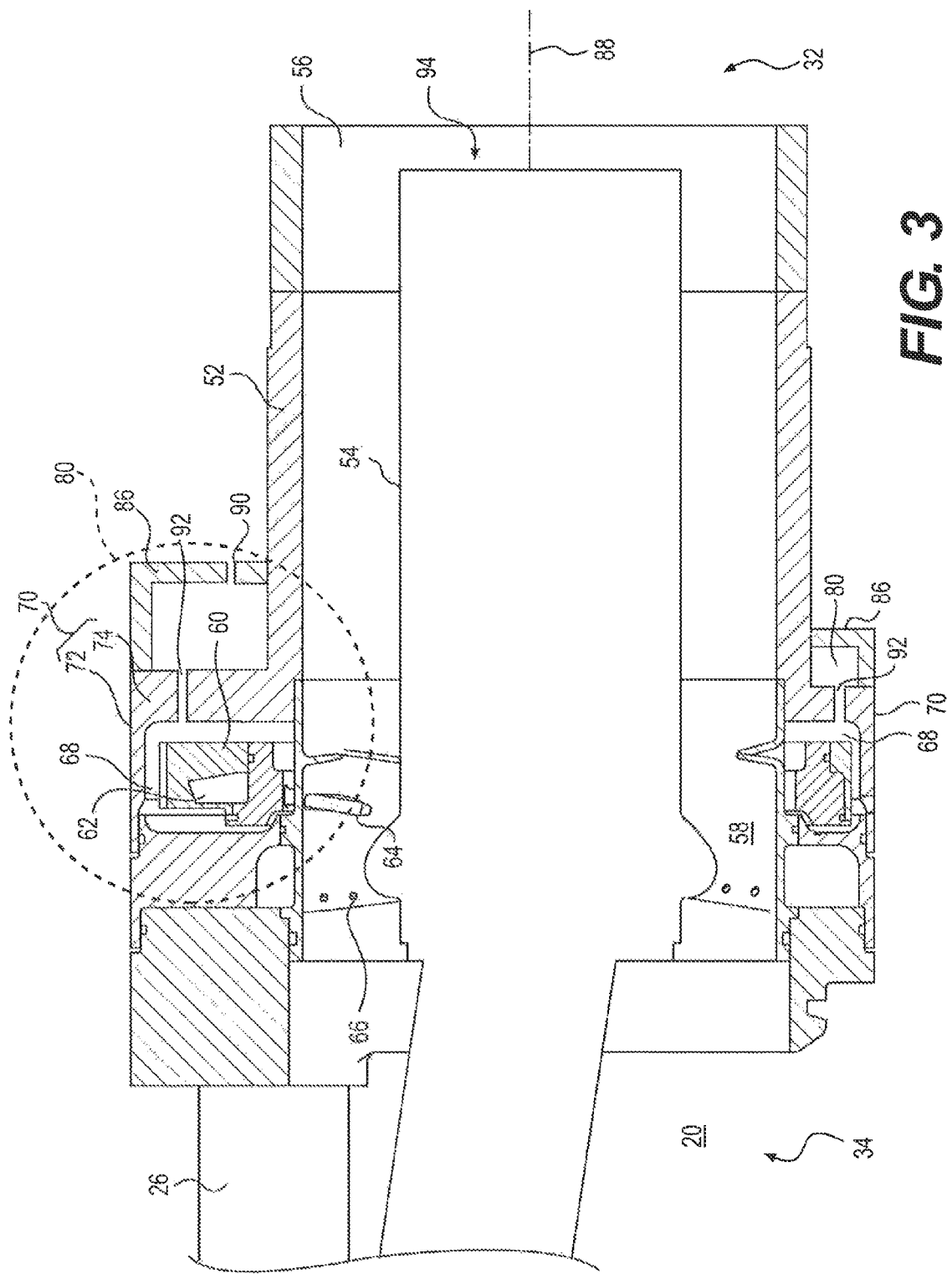
FIG. 3 is a cross-sectional view of the fuel injector of FIG. 2 along a longitudinal plane.

FIG. 3 is a cross-sectional illustration of fuel injector 50 along plane 3-3 of FIG. 2. Pilot assembly 94 includes multiple components that cooperate together to deliver the pilot fuel-air mixture to combustor 22. Since the operation of fuel injectors and pilot assemblies are known in the art, details of the pilot assembly 94 are omitted for the sake of brevity. Proximate second end 34, annular duct 56 includes an air swirler 58 that is configured to impart a swirl to the compressed air entering annular duct 56 from enclosure 20. Fuel from liquid fuel line 24 (see FIG. 2) is directed to a liquid fuel manifold (manifold 60) annularly disposed about the air swirler 58. The manifold 60 includes a liquid fuel gallery (fuel gallery 62) containing liquid fuel circumferentially disposed around the manifold 60. A plurality of spokes 64 (see also FIG. 5) deliver the liquid fuel from fuel gallery 62 to the compressed air flowing past air swirler 58. This fuel mixes with the swirled air stream to form the premixed fuel-air mixture that enters combustor 22 through annular duct 56. Although FIGS. 2 and 3 illustrate the spokes 64 as being coupled to air swirler 58, this is not a requirement, and in some embodiments, the spokes 64 may be positioned upstream or downstream of air swirler 58. In dual fuel injectors, air swirler 58 also includes a plurality of orifices 66 configured to inject gaseous fuel into the swirled air stream. Depending upon the type of fuel the fuel injector is operating on, one of liquid fuel or gaseous fuel is delivered to the compressed air flowing past air swirler 58. This fuel (liquid or gaseous) will mix with the compressed air to form a fuel-air mixture.

Figure 4:
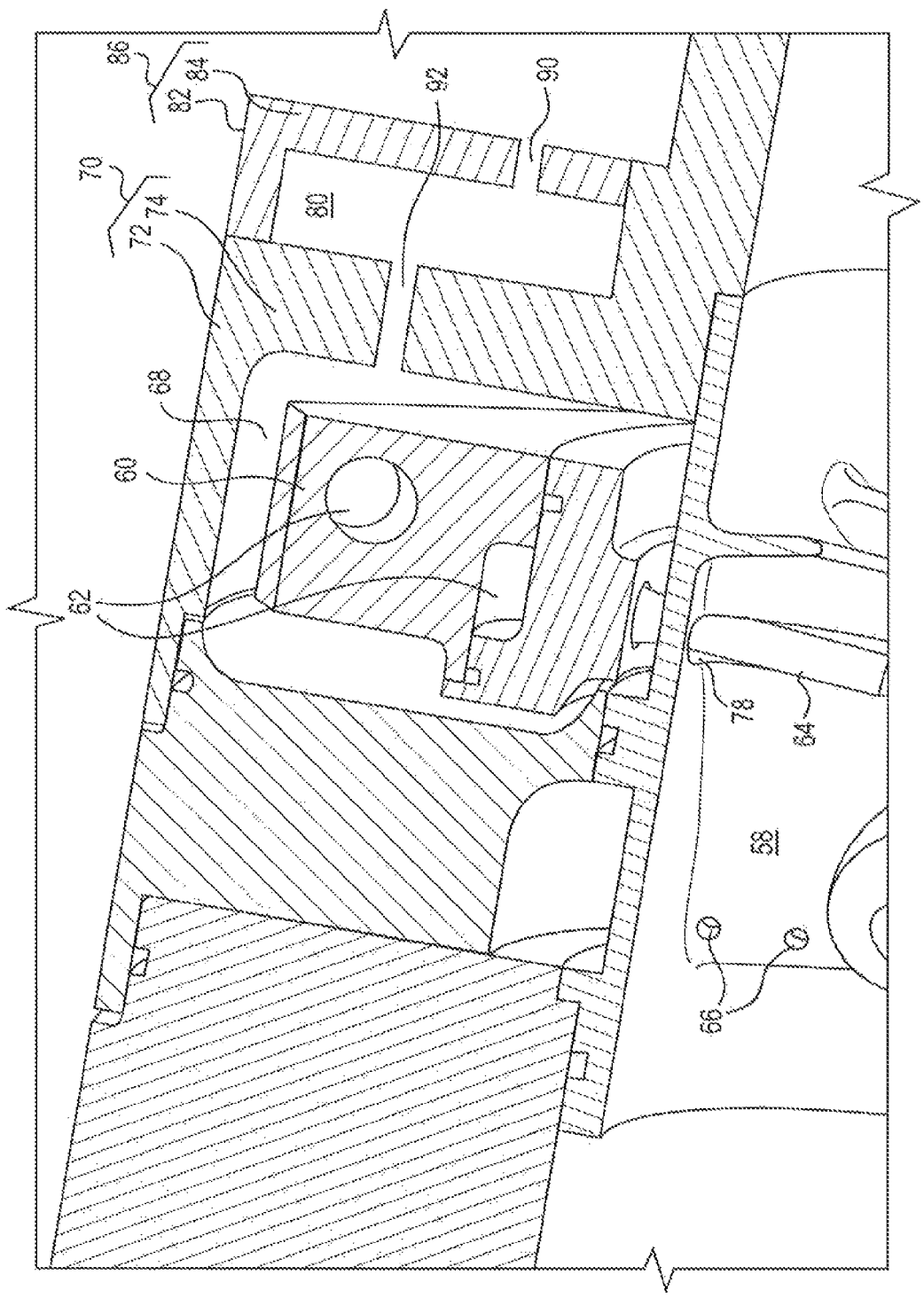
FIG. 4 is a perspective view of a portion of the fuel gallery of the fuel injector of FIG. 2.

FIG. 4 is a perspective view of a region of fuel injector 50 around the fuel gallery 62 (identified in FIG. 3). Liquid fuel from liquid fuel line 24 is directed into the liquid fuel gallery 62 at an inlet (not shown). The liquid fuel gallery 62 wraps around the longitudinal axis 88 to extend from the inlet to a tip that, in some embodiments, may extend past and overlap the inlet. Fuel injector 50 may include any number of spokes 64, and these spokes 64 may be arranged in any manner around the longitudinal axis 88. En some embodiments, the spokes 64 may be arranged symmetrically around the longitudinal axis 88. In some embodiments, a spoke 64 may be coupled to every vane (or every other vane) of the air swirler 58. These spokes 64 fluidly couple the fuel gallery 62 to the annular duct 56. Spokes 64 extend into the annular duct 56 through the vanes of air swirler 58 and spray liquid fuel from liquid fuel gallery 62 into the compressed air flowing past the air swirler 58.

Manifold 60 is positioned in fuel injector 50 proximate the enclosure 20 containing compressed air at a high temperature. To help prevent coking of the fuel in the liquid fuel gallery 62, an insulating air cavity (insulating chamber 68) is formed at least partially around the circumference of the manifold 60. As illustrated in FIGS. 3 and 4, the insulating chamber 68 may also extend at least partially around a cross-section of the manifold 60. The insulating chamber 68 shields the liquid fuel gallery 62 from the high temperature air in enclosure 20, and helps to maintain the liquid fuel gallery 62 at a temperature below the coking temperature of liquid fuel. The insulating chamber 68 is formed by enclosing the manifold 60 using a casing 70 at the upstream end of the premix barrel 52. The casing 70 may be an inverted L-shaped region, having a horizontal wall 72 connected to a vertical wall 74. The casing 70 separates the manifold 60 from the enclosure 20 and defines the insulating chamber 68 around the manifold 60. The spokes 64 that direct liquid fuel from the fuel gallery 62 to the annular duct 56 extend into the vanes of the air swirler 58 through the insulating chamber 68. A clearance 78 (see FIG. 4) formed between the spokes 64 and the swirler vanes fluidly couple the insulating chamber 68 to the annular duct 56.

During operation of GTE 10 with liquid fuel, liquid fuel is discharged into annular duct 56 through spokes 64. The liquid fuel mixes with the compressed air in annular duct 56 and flows downstream towards the combustor 22. When GTE 10 operates on gaseous fuel, liquid fuel supply to the liquid fuel gallery 62 is turned off, and gaseous fuel is discharged into the annular duct 56 through orifices 66. The gaseous fuel mixes with the compressed air in the annular duct 56 and flows past the spokes 64 towards the combustor 22. As the fuel-air mixture flows past the spokes 64, a portion of the fuel-air mixture may migrate into the fuel gallery 62 and the insulating chamber 68 through the outlet of the spokes 64 and clearance 78. This ingress of fuel into the inactive fuel lines and cavities of a fuel injector is called cross-migration.

In some applications, the migrated fuel-air mixture may ignite within the fuel gallery 62 and/or the insulating chamber 68. This phenomenon, called auto-ignition, is especially common with fuels having a low auto-ignition delay time. Auto-ignition delay time is a measure of the time it takes for a fuel at a certain temperature to ignite. Fuels that include heavy hydrocarbons (such as, for example, butane, propane, etc.) are known to have low auto-ignition delay time. In addition to other unintended consequences, auto-ignition may cause coking of fuel in fuel passages.

Pressure variations (such as circumferential) of the fuel-air mixture in the annular duct 56 may increase the ingress of gaseous fuel into the fuel gallery 62 and the insulating chamber 68. These pressure variations may occur in a fuel injector due to several factors. For example, in some fuel injectors, structures (such as, for example, struts, etc.) in the annular duct 56 upstream of air swirler 58 cause pressure perturbations downstream of the structure. In some fuel injectors, combustion induced pressure fluctuations in the combustor 22 interact with the fuel flow and induce circumferentially varying pressure pulses in the annular duct 56. Because of these pressure fluctuations, spokes 64 that are in regions of high pressure may experience inflow of the fuel-air mixture into the fuel gallery 62 and/or the insulating chamber 68 through these spokes. And, spokes 64 that are in regions of low pressure may experience outflow of the fuel-air mixture through these spokes.

In order to prevent or minimize cross-migration of the fuel-air mixture into fuel gallery 62, compressed air from compressor system 12 (or another compressor) may be cooled (in a heat exchanger, etc.) and directed into fuel gallery 62 when GTE 10 operates on gaseous fuel. This compressed air, being at a higher pressure than the fuel-air mixture in annular duct 56, prevents ingress of the fuel-air mixture into the fuel gallery 62. The higher pressure compressed air in the fuel gallery 62 flows out into the annular duct 56 through spokes 64, and become part of the premixed fuel-air mixture directed to combustor 22.

In order to prevent or minimize ingress of the fuel-air mixture into insulating chamber 68, compressed air from enclosure 20 may also be directed into the insulating chamber 68. This compressed air may keep the pressure in the insulating chamber 68 above the pressure in the annular duct 56, and prevent or minimize ingress of fuel into the insulating chamber 68. To prevent coking of liquid fuel in the liquid fuel gallery 62, it is desirable to maintain the walls of the liquid fuel gallery 62 below a coking temperature (for instance, below about 400° F. (204.4° C.)). In some embodiments, the temperature of the compressed air in enclosure 20 may be significantly higher than the coking temperature (for example, above about 800° F.). Further, directing the compressed air from enclosure 20 directly into insulating chamber 68 may cause the compressed air to enter the insulating chamber 68 at a high velocity and impinge on the manifold 60. The high velocity stream of hot compressed air impinging on the manifold 60 may cause coking of liquid fuel in the vicinity of the impinging stream. Therefore, compressed air from the enclosure 20 is directed into the insulating chamber 68 through a metering chamber 80 that fluidly couples the insulating chamber 68 to the enclosure 20.

Metering chamber 80 is positioned in the flow path of compressed air from the enclosure 20 to the insulating chamber 68. Metering chamber 80 may be axially or radially spaced apart from the insulating chamber 68. FIGS. 3 and 4 illustrate an embodiment of fuel injector 50 in which an annular cavity axially spaced apart (along longitudinal axis 88) from the insulating chamber 68 serves as the metering chamber 80. Metering chamber 80 may be defined by a cover 86 that extends around the premix barrel 52. The cover 86 may include a horizontal wall 82 that extends axially and a vertical wall 84 that extends radially. One or more metering holes 90 may fluidly couple the metering chamber 80 to the enclosure 20. These metering holes 90 may be openings on the cover 86 arranged around the longitudinal axis 88. Metering holes 90 may direct hot compressed air from the enclosure 20 into the metering chamber 80. One or more purge holes 92 may fluidly couple the metering chamber 80 to the insulating chamber 68. These purge holes 92 may be openings on the wall that separates the insulating chamber 68 from the metering chamber 80, and may direct the compressed air from the metering chamber 80 to the insulating chamber 68.

Although metering holes 90 are shown to be positioned on the vertical wall 84 of the cover 86, this is not a limitation. In general, the metering holes 90 may be positioned anywhere on cover 86. For instance, in some embodiments, the metering holes 90 may be positioned on the horizontal wall 82 of the cover 86. Purge holes 92 may also be positioned anywhere on casing 70. Although the purge holes 92 are illustrated as being positioned on vertical wall 74 of the casing 70 (in FIGS. 3 and 4), as will be explained later (see FIG. 5), in some embodiments, the purge holes 92 may be positioned on the horizontal wall 72.

The compressed air from enclosure 20 that enters the insulating chamber 68 (via the metering chamber 80) through the purge holes 92 may be at a higher pressure than the fuel-air mixture in annular duct 56. This higher pressure compressed air in insulating chamber 68 prevents the ingress of fuel-air mixture from the annular duct 56 into the insulating chamber 68. Because of its higher pressure, the compressed air in insulating chamber 68 flows into the annular duct 56 through the clearance 78 and mixes with the fuel-air mixture flowing therethrough.

The number, size, and location of the metering holes 90 and the purge holes 92 may be configured to minimize coking, cross-migration, and auto-ignition of the fuel-air mixture in insulating chamber 68. In general, increasing the air flow from enclosure 20 into the insulating chamber 68 may quickly flush (or purge) the fuel-air mixture (from the insulating chamber 68) back into annular duct 56, and thus prevent auto-ignition. However, since the compressed air in enclosure 20 is at a high temperature, increasing the flow of compressed air into the insulating chamber 68 may increase the likelihood of coking. As explained previously, the smaller the size of an opening, higher will be the velocity of the compressed air stream flowing through the opening. A high velocity stream of compressed air entering the insulating chamber 38 increases the likelihood of hot spots and coking in some regions of the manifold 60. To minimize the possibility of auto-ignition and coking, the size and number of metering holes 90 is lower than the size and the number of purge holes 92. The size and number of the metering holes 90 may be selected to direct a sufficient amount of compressed air to enter the insulating chamber 68 without excessively increasing the temperature in the insulating chamber 68. The size and number of purge holes 92 may be selected to direct compressed air evenly into the insulating chamber 68 at a sufficiently low velocity.

In some embodiments, the metering holes 90 and/or the purge holes 92 may be symmetrically arranged about the longitudinal axis 88. In some embodiments, the metering holes 90 and/or the purge holes 92 may not be symmetrically arranged about the longitudinal axis 88. Instead, the metering holes 90 and/or the purge holes 92 may be selectively provided (or concentrated) at locations where they provide the most benefit. For instance, because of circumferential pressure variations in annular duct 56, inflow of fuel-air mixture into the insulating chamber 68 through clearances 78 associated with some spokes 64 may be higher than the inflow through other clearances 78. In some such embodiments, more purge holes 92 may be provided proximate clearances 78 of spokes 64 that experience a higher amount of inflow. Also, in some embodiments, structural features of the manifold 60 (such as, notches, etc.) may hinder the free flow of fuel-air mixture through the insulating chamber 68, and increase the possibility of auto-ignition proximate these features. Therefore, in these embodiments, more purge holes 92 may be provided proximate such structural features.

In some embodiments, to prevent the compressed air from enclosure 20 from flowing into the insulating chamber 68 in an unobstructed manner, the metering holes 90 and the purge holes 92 may be misaligned (that is, not aligned along a straight line). An aligned metering hole 90 and purge hole 92 may allow the compressed air from enclosure 20 to enter the insulating chamber 68 without experiencing a significant drop of velocity in the metering chamber 80. Misaligning these openings causes the compressed air stream to be obstructed by a wall, and slow down in the metering chamber 80, before entering the insulating chamber 68 through a purge hole 92. In some embodiments, the metering holes 90 and the purge holes 92 may be radially misaligned. That is, as illustrated in FIGS. 3 and 4, the metering holes 90 and the purge holes 92 may be spaced apart in the radial direction. In some embodiments, these openings may be circumferentially spaced apart. It is also contemplated, that in some embodiments, the metering holes 90 and the purge holes 92 may be spaced apart in both a radial and a circumferential direction.

In general, the size and number of metering holes 90 is smaller than the size and number of purge holes 92. However, the exact size, number, configuration (circular, square, etc.), and location of the metering holes 90 and purge holes 92 in an application may depend upon the specific fuel injector design and operating conditions of GTE 10. However, it is expected that 2-7 smaller metering holes 90 having widths/diameters between about 0.01-0.07 inches (0.25-1.78 mm), and 5-20 larger purge holes 92 having widths/diameters between about 0.04-0.09 inches (1.02-2.29 mm) will provide substantial reduction in cross-migration and auto-ignition, without increasing the fuel gallery 62 temperature above coking temperature. Throughout this specification, the term "about" is used to indicate a potential variation of ±10% from an indicated value to account for experimental inaccuracies (such as, measurement errors). In the above-described exemplary embodiments, the number and diameter of the purge holes 92 are larger than the number and diameter of the metering holes 90. For example, in an embodiment of fuel injector having a metering hole 90 of 0.07 inches, the size of the purge hole 92, will be greater than 0.07 inches (and less than or equal to 0.09 inches). Similarly, if the number of metering holes 90 in a fuel injector is 7, the number of purge holes 92 in that fuel injector will be between 8 and 20. In the above-described embodiments, the ratio of the total area of the metering holes 90 (that is, number of metering holes multiplied by the area of each metering hole) to the total area of the purge holes 92 is between about 0.00124 to about 3.184. In some embodiments, all the metering holes 90 may have about the same diameter, and all the purge holes 92 may have about the same diameter. In other embodiments, the diameters of the metering holes 90 and the purge holes 92 may vary between the above-described ranges.

Figure 5:
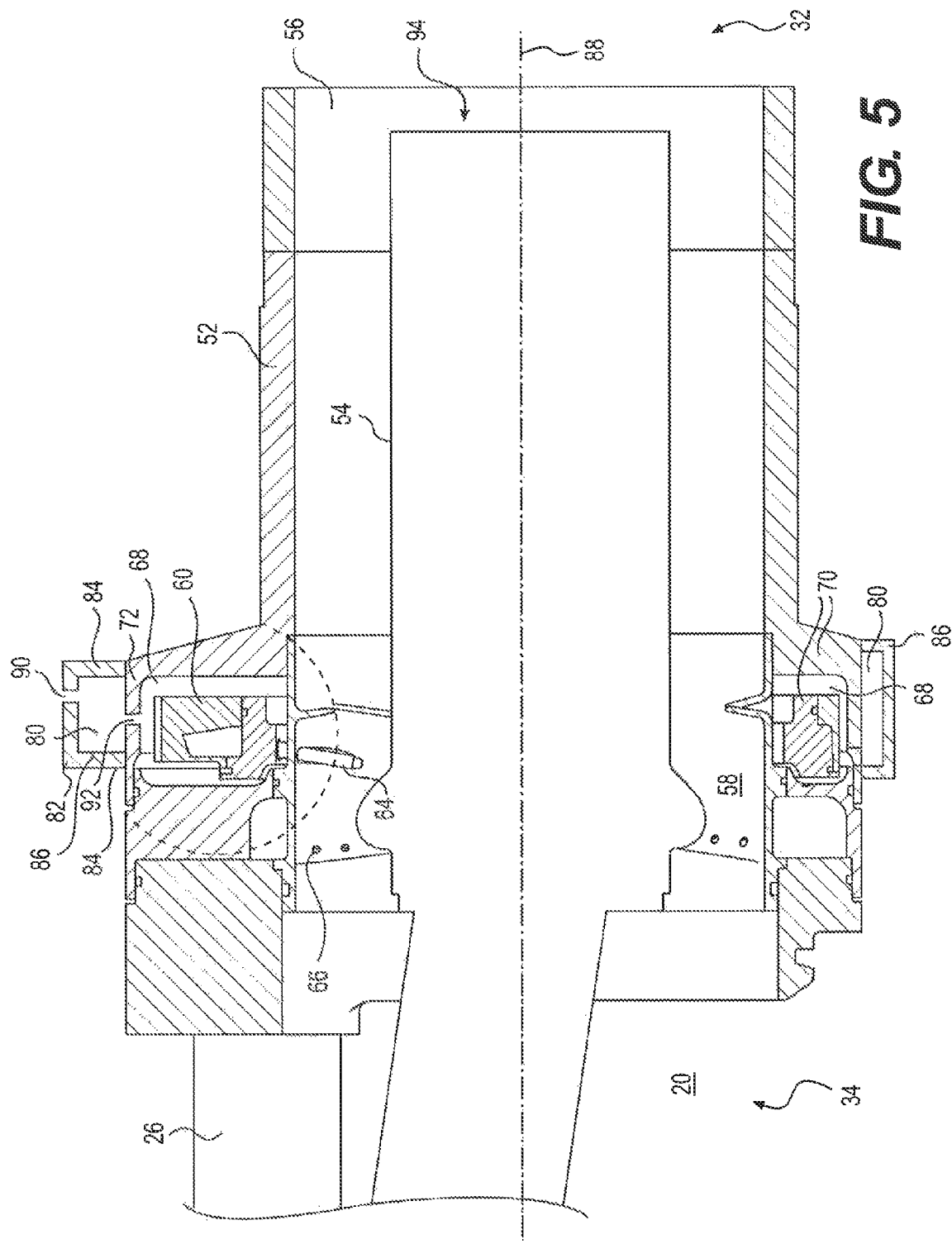
FIG. 5 is a cross-sectional view of another embodiment of a fuel injector along a longitudinal plane.

FIG. 5 illustrates an embodiment of fuel injector 50 in which the insulating chamber 68 and the metering chamber 80 are radially spaced apart. In the embodiment of FIG. 5, the horizontal wall 72 of the casing 70 may separate the insulating chamber 68 from the metering chamber 80, in such embodiments, the purge holes 92 may be positioned on the horizontal wall 72, and the metering holes 90 may be positioned in a vertical wall 84 or the horizontal wall 82 (as illustrated in FIG. 5) of the cover 86. To prevent the compressed air from enclosure 20 from flowing into the insulating chamber 68 in an unobstructed manner, the metering holes 90 and the purge holes 92 may be misaligned. In some embodiments, the metering holes 90 and the purge holes 92 may be spaced apart in the axial direction (as illustrated in FIG. 5), and in some embodiments, these openings may be (or may also be) spaced apart in the circumferential direction. The numbers and sizes of the metering holes 90 and the purge holes 92 may vary in the ranges described previously.

INDUSTRIAL APPLICABILITY

The disclosed gas turbine fuel injector may be applicable to any turbine engine where it is desired to maintain a temperature of the liquid fuel gallery of the fuel injector below a coking temperature of the fuel. To insulate the fuel gallery, an insulating chamber is provided around the gallery. To prevent cross-migration and auto-ignition in the insulating chamber, the chamber is purged with compressed air. To prevent coking of fuel in the fuel gallery, compressed air is directed into the insulating chamber through a metering chamber. The operation of a gas turbine engine with an exemplary fuel injector having a metering chamber will now be described.

When GTE 10 is operated on gaseous fuel, fuel supply to the liquid fuel gallery 62 of the fuel injector 50 is turned off, and gaseous fuel is discharged into the fuel injector 50 to mix with air and form a fuel-air mixture. To prevent cross-migration of the gaseous fuel-air mixture into the inactive fuel gallery 62, cooled compressed air is directed into the fuel gallery 62. To prevent cross-migration into the insulating chamber 68 around the fuel gallery 62, hot compressed air is directed into the insulating chamber 68 through a metering chamber 80. To reduce cross-migration and auto-ignition, while reducing coking, 3-5 metering holes 90 direct compressed air from the enclosure 20 into the metering chamber 80, and 6-10 purge holes 92 direct the compressed air from the metering chamber 80 into the insulating chamber 68. The metering holes 90 may have diameters between about 0.01-0.04 inches (0.254-1.02 mm), and the purge holes 92 may have diameters between about 0.05-0.08 inches (1.27-2.03 mm). To achieve the desired level of cross-migration reduction with these purge holes 92, the purge holes are provided at locations where maximum benefit is realized. Directing compressed air into the insulating chamber 68 through the metering chamber 80 prevents high velocity hot compressed air from creating hot spots in the insulating chamber 68 and localized coking of liquid fuel.

It will be apparent to those skilled in the art that various modifications and variations can be made to the disclosed gas turbine fuel injector with metering cavity. Other embodiments will be apparent to those skilled in the art from consideration of the specification and practice of the disclosed gas turbine fuel injector. It is intended that the specification and examples be considered as exemplary only, with a true scope being indicated by the following claims and their equivalents.

What is claimed is:

1. A fuel injector for a gas turbine engine comprising:
a flow path for a fuel-air mixture extending longitudinally through the fuel injector;
a fuel gallery extending circumferentially around the flow path and adapted to inject a liquid fuel into the flow path; and
an annular casing positioned circumferentially around the fuel gallery to define an insulating chamber around the fuel gallery;
an annular cover extending around the fuel injector to define a metering chamber;
one or more purge holes fluidly coupling the metering chamber to the insulating chamber; and one or more metering holes fluidly coupling the metering chamber to a volume exterior to the fuel injector.

2. The fuel injector of claim 1, wherein the one or more purge holes is misaligned with the one or more metering holes.

3. The fuel injector of claim 1, wherein a size of the one or more purge holes is greater than a size of the one or more metering holes.

4. The fuel injector of claim 3, wherein the size of the one or more purge holes is between about 0.04-0.09 inches (1.02-2.29 mm), and the size of the one or more metering holes is between about 0.01-0.07 inches (0.25-1.78 mm).

5. The fuel injector of claim 1, wherein a number of the one or more purge holes is greater than a number of the one or more metering holes.

6. The fuel injector of claim 5, wherein the number of the one or more purge holes is between 5-20, and the number of the one or more metering holes is between 2-7.

7. The fuel injector of claim 1, wherein the one or more purge holes is positioned on the annular casing and the one or more metering holes is positioned on the annular cover.

8. The fuel injector of claim 1, further including one or more spokes configured to inject the liquid fuel from the fuel gallery to the flow path, wherein the insulating chamber is fluidly coupled to the flow path through a clearance associated with the one or more spokes.

9. The fuel injector of claim 1, wherein the insulating chamber and the metering chamber are axially spaced apart.

10. The fuel injector of claim 1, wherein the insulating chamber and the metering chamber are radially spaced apart.

11. A method of operating a gas turbine engine including a fuel injector, the fuel injector including a fuel gallery extending circumferentially around the fuel injector, an annular casing positioned circumferentially around the fuel gallery to define an insulating chamber around the fuel gallery, and a metering chamber spaced apart from the insulating chamber and circumferentially extending around the fuel injector, the insulating chamber and the metering chamber being fluidly coupled together by one or more purge holes, and the metering chamber being fluidly coupled to a compressed air space external to the fuel injector by one or more metering holes, the method comprising:
mixing a fuel with compressed air and directing the resulting fuel-air mixture along a fuel flow path of the fuel injector;
directing compressed air from the compressed air space to the metering chamber through the one or more metering holes at a first velocity;
directing the compressed air from the metering chamber to the insulating chamber through the one or more purge holes at a second velocity lower than the first velocity; and
exhausting the compressed air from the insulating chamber to the fuel flow path of the fuel injector.

12. The method of claim 11, further including directing compressed air into the fuel gallery, and exhausting the compressed air from the fuel gallery to the flow path of the fuel injector.

13. The method of claim 11, wherein
directing compressed air from the compressed air space to the metering chamber includes directing the compressed air through 2-7 metering holes, and
directing the compressed air from the metering chamber to the insulating chamber includes directing the compressed air through 5-20 purge holes.

14. The method of claim 11, wherein
directing compressed air from the compressed air space to the metering chamber includes directing the compressed air through the one or more metering holes having a size between about 0.01-0.07 inches (0.25-1.78 mm), and
directing the compressed air from the metering chamber to the insulating chamber includes directing the compressed air through the one or more purge holes having a size greater than the size of the one or more metering holes, the size of the one or more purge holes being between about 0.04-0.09 inches (1.02-2.29 mm).

15. A gas turbine engine, comprising:
a compressor;
a combustor positioned downstream of the compressor; and
a fuel injector fluidly coupling the compressor and the combustor, the fuel injector being configured to direct a fuel-air mixture to the combustor through a flow path that extends longitudinally though the fuel injector, the fuel injector including:
a gallery for liquid fuel at least partially encircling the flow path;
one or more spokes fluidly coupling the gallery to the flow path;
an annular casing extending circumferentially around the fuel injector to define an insulating chamber around the gallery;
an annular cover extending circumferentially around the fuel injector to define a metering chamber spaced apart from the insulating chamber;
one or more purge holes fluidly coupling the insulating chamber and the metering chamber; and
one or more metering holes fluidly coupling the metering chamber to a compressed air space around the fuel injector.

16. The gas turbine engine of claim 15, wherein a size and a number of the one or more purge holes is greater than a size and a number of the one or more metering holes.

17. The gas turbine engine of claim 16, wherein the size of the one or more metering holes is between about 0.01-0.07 inches (0.25-1.78 mm), and the size of the one or more purge holes is between about 0.04-0.09 inches (1.02-2.29 mm).

18. The gas turbine engine of claim 16, wherein the number of the one or more metering holes is between 2-7, and the number of the one or more purge holes is between 5-20.

19. The gas turbine engine of claim 15, wherein the one or more purge holes is misaligned with the one or more metering holes.

20. The gas turbine engine of claim 15, wherein the insulating chamber is fluidly coupled to the flow path through a clearance associated with the one or more spokes.

* * * * *